United States Patent
Saito et al.

(10) Patent No.: US 7,911,519 B2
(45) Date of Patent: Mar. 22, 2011

(54) SOLID-STATE IMAGE PICKUP DEVICE, DRIVING METHOD THEREOF, AND CAMERA SYSTEM

(75) Inventors: Shigeru Saito, Kanagawa (JP); Yoko Terato, Hokkaido (JP)

(73) Assignee: Sony Corporation, Tokyo (JP)

( * ) Notice: Subject to any disclaimer, the term of this patent is extended or adjusted under 35 U.S.C. 154(b) by 321 days.

(21) Appl. No.: 12/233,720

(22) Filed: Sep. 19, 2008

(65) Prior Publication Data

US 2009/0086075 A1   Apr. 2, 2009

(30) Foreign Application Priority Data

Sep. 28, 2007   (JP) ................................. 2007-256768

(51) Int. Cl.
*H04N 3/14* (2006.01)
*H04N 5/335* (2006.01)

(52) U.S. Cl. ........ 348/294; 348/302; 348/308; 341/158; 341/168; 341/172

(58) Field of Classification Search ................. 348/294, 348/302, 308; 341/158, 168, 172; 257/290–292
See application file for complete search history.

(56) References Cited

U.S. PATENT DOCUMENTS

| 7,113,212 | B2* | 9/2006 | Yonemoto et al. | 348/302 |
| 2005/0195304 | A1* | 9/2005 | Nitta et al. | 348/308 |
| 2008/0273107 | A1* | 11/2008 | Taura | 348/308 |

FOREIGN PATENT DOCUMENTS

| JP | 2005-303648 | 10/2005 |
| JP | 2005-323331 | 11/2005 |

OTHER PUBLICATIONS

W. Yang et al.; An Integrated 800×600 CMOS Image System; ISSCC Digest of Technical Papers; pp. 304-305; Feb. 1999.

* cited by examiner

*Primary Examiner* — Yogesh K Aggarwal
(74) *Attorney, Agent, or Firm* — SNR Denton US LLP

(57) ABSTRACT

A solid-state image pickup device includes a pixel array including pixels arranged in a matrix, a pixel signal readout unit, and a timing control unit for controlling processing of the pixel signal readout unit by using a timing signal. The pixel signal readout unit includes: a plurality of comparators for comparing a readout signal potential with a reference voltage to generate a determination signal and outputting the determination signal, and a plurality of counters. Each counter counts a comparison time of each corresponding one of the comparators. The timing control unit (a) divides a predetermined processing period into at least a first-time readout period, a first comparison period, a second-time readout period, and a second-time comparison period, (b) classifies the periods into two periods, and (c) generates a timing signal of processing of each divided period by counting for each divided period in the counter.

9 Claims, 13 Drawing Sheets

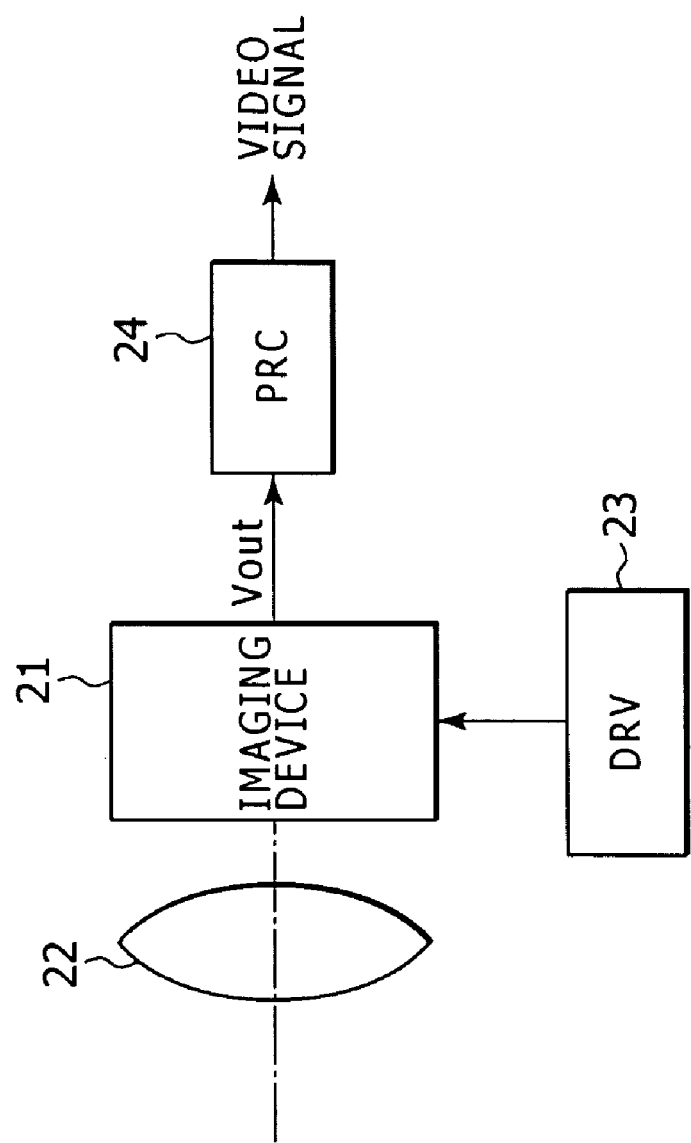

SOLID-STATE IMAGE PICKUP DEVICE, DRIVING METHOD THEREOF, AND CAMERA SYSTEM

CROSS-REFERENCE TO RELATED APPLICATIONS

The present application claims benefit of priority of Japanese patent Application No. 2007-256768 filed in the Japanese Patent Office on Sep. 28, 2007, the entire disclosure of which is incorporated herein by reference.

BACKGROUND OF THE INVENTION

1. Field of the Invention

The present invention relates to a solid-state image pickup device typified by CMOS image sensor, a method of driving the same, and camera system using the image pickup device.

2. Description of Related Art

A CMOS image sensor has recently been paid attention as a solid-state image sensor to be substituted for a charge-coupled device (CCD).

This is because a CMOS image sensor overcomes various issues that a system becomes very complicated, including a necessity of dedicated processes for manufacture of CCD pixels, a necessity of a plurality of power supply voltages for operation, and a necessity of combining a plurality of peripheral ICs for operation.

A CMOS image sensor allows the manufacturing processes similar to those for a general CMOS integrated circuit. In addition, the CMOS image sensor may be driven by a single power source, and may be implemented in the same chip as that of analog circuits and logical circuits using CMOS processes. Thus, the CMOS image sensor has a plurality of considerable merits such as reduction in the number of peripheral ICs.

The main trend of an output circuit in a CMOS image sensor is a one-channel output by using an FD amplifier with a floating diffusion (FD) layer.

In contrast, a CMOS image sensor has an FD amplifier at each pixel, and the main trend of the output method is a column-parallel output type that each row in a pixel array is selected and the selected pixel signals in the row are read out to column directions at the same time.

This is because parallel processing is advantageous since the FD amplifiers disposed within the pixels are difficult to obtain a sufficient driving ability and therefore a data rate is required to be lowered.

A large variety of signal output circuits have been proposed for a column-parallel output type CMOS image sensor. One of most advanced types is that an analog-to-digital converter (hereinafter abbreviated as "ADC") is provided for each column and a pixel signal is outputted as a digital signal.

A CMOS image sensor mounting column-parallel type ADC is disclosed, for example, in "An Integrated 800×600 CMOS Image System", by W. Yang et. al., ISSCC Digest of Technical Papers, pp. 304 and 305, February, 1999, and Japanese Unexamined Patent Application Publications Nos. 2005-303648 and 2005-323331.

FIG. 1 is a block diagram showing a configuration example of solid-state image pickup device (CMOS image sensor) with a column-parallel ADC.

The solid-state image pickup device 1 includes a pixel array unit 2 as an imaging unit, a row scanning circuit 3, a column scanning circuit 4, a timing control circuit 5, an ADC group 6, a digital-analog converter unit (hereinafter abbreviated to a DAC (digital-to-analog converter)) 7, and a data output circuit 8 including a sense amplifier circuit (S/A).

The pixel array unit 2 is composed of unit pixels 2-1, each including a photodiode and an intra-pixel amplifier, disposed in a matrix.

The solid-state image pickup device 1 includes a control circuit for sequentially reading out pixel signals of the pixel array unit 2. The control circuit includes a timing control circuit 5 for generating internal clocks, a row scanning circuit 3 for controlling row addressing and row scanning, and a column scanning circuit 4 for controlling column addressing and column scanning.

The ADC group 6 includes column-parallel ADC blocks 6-4 each having an ADC 6A disposed for each of column lines V0, V1, . . . of columns of the pixel array unit. The ADC blocks are composed of: (n+1) comparators (REF) 6-1 disposed for the columns of the pixel array unit; asynchronous up/down-counters (hereinafter called counters) 6-2; memories (latches) 603, and switched 6-4. The comparator (REF) 6-1 compares a ramp waveform RAMP obtained by stepwise changing a reference voltage generated by DAC 7 with each of analog signals supplied from each of row lines H0, H1, . . . via column lines V0, V1 . . . . The counter 6-2 counts up (or down) upon reception of an output of the comparator 6-1 and a clock CK. The memory 6-3 holds a count value of the counter 6-2. The switch 6-4 selectively connects either an output of the counter 6-2 or the memory 6-3 in response to a signal SW.

An output of each memory 6-3 is connected to 2n data transfer lines 9 each having a 2-bit width. A data output circuit 8 including 2n sense circuits and 2n subtractor circuits is disposed for the 2n data transfer lines 9.

The counter 6-2 having a holding circuit function is in an up-count (or down-count) state at the initial stage to perform reset count. When the counter 6-2 performs reset count to invert an output COMPOUTi of the corresponding comparator 6-1, the counter 6-2 stops the up-count operation and holds the count value in the memory 6-3.

In this case, the initial value of the counter 6-2 is assumed to have an arbitrary value of gradation of AD conversion, e.g., a value of "0". During this reset count period, reset components $\Delta V$ of the unit pixel 111 are read out.

Thereafter, the counter 6-2 enters a down-count state, performs data count corresponding to an incident light amount. When the output COMPOUTi of the corresponding comparator 6-1 is inverted, a count value corresponding to a comparison period is held in the memory 6-3.

The count values held in the memories 6-3 are scanned by the column scanning circuit 4, and inputted to the output circuit 8 via the data transfer lines 9.

Here, the operation of the solid-state image pickup device (CMOS image sensor) 1 will be described.

After a first readout operation from the unit pixels 2-1 at an arbitrary row Hx to the column lines V0, V1, . . . is stabilized, DAC 7 supplies the comparators 6-1 with the ramp waveform RAMP obtained by changing stepwise the reference voltage depending on time, and each comparator 6-1 compares RAMP with a voltage at the corresponding column line Vx.

In parallel with stepwise input of the ramp waveform RAMP, the counter 6-2 performs a first count operation.

In this case, when RAMP and a voltage at the column line Vx becomes equal, an output of the comparator 6-1 is inverted, so that the count operation of the counter 6-2 stops and a count value corresponding to the comparison period is held in the memory 6-3.

During the first readout operation, the reset components ΔV of the unit pixel 2-1 are read out. The reset components ΔV contain noises varying in each unit pixel 2-1 as an offset.

However, a variation in the reset components ΔV is generally small, and the reset level is common for all pixels. As a result, an output at each column line Vx has generally a known value.

Accordingly, during the first reset components ΔV readout operation, the comparison period can be shortened by adjusting a ramp waveform (RAMP) voltage. In this case, for example, comparing ΔV is performed during a count period of 7 bits (128 clocks).

The second readout operation performs an operation similar to the first readout operation, by reading out signal components corresponding to an incident light amount of each unit pixel 2-1 in addition to the reset components ΔV.

Namely, after the second operation of reading out from the unit pixels 2-1 at the arbitrary row Hx to the column lines V0, V1, . . . is stabilized, DAC 7 supplies the comparators 6-1 with the ramp waveform RAMP obtained by changing stepwise the reference voltage with time, and each comparator 6-1 compares RAMP with a voltage at the corresponding column line Vx.

In parallel with stepwise input of the ramp waveform RAMP, the counter 6-2 performs a second count operation.

In this case, when RAMP and a voltage at the column line Vx becomes equal, an output of the comparator 6-1 is inverted and the count value corresponding to the comparison period is held in the memory 6-3 at the same time.

In this case, the first count value and second count value are held in the memory 6-3 at different positions.

After the completion of the above-described AD conversion, the column scanning circuit 4 transfers the first and second digital signals of n-bit held in the memories 603 via the 2n data transfer lines, the data output circuit 8 detects the digital signals, and the subtractor circuits sequentially perform (second signals)-(first signals) and the results are outputted to the external. Thereafter, a similar operation is sequentially repeated for each row to generate a two-dimensional image.

The above operation is performed in one horizontal unit period (1H).

During 1H, the first readout operation from the unit pixels 2-1 at an arbitrary row Hx to the column lines V0, V1, . . . is represented by a P-phase readout PR, the first comparison at the comparator 6-1 is represented by a P-phase comparison PC, the second readout operation is represented by a D-phase readout DR, the second comparison at the comparator 6-1 is represented by a D-phase comparison DC, and a post process after D-phase processing is represented by a post D-phase process DAP, each operation being continuously performed.

The timing control circuit 5 performs timing control of the P-phase readout PR, P-phase comparison PC, D-phase readout DR, D-phase comparison DC, and post D-phase process DAP.

As shown in FIG. 2, in the timing control circuit 5, two circuits each having a 12-bit register 5-1, a 12-bit counter 5-2, and a comparator 5-3 are used fundamentally in order to set a rising and falling of a timing signal TMG.

SUMMARY OF THE INVENTION

FIG. 3 is a timing chart illustrating the operation including generating a timing signal based on the circuit shown in FIG. 2.

With this method, in response to a timing signal XHS inputted from an external of the sensor, a count operation of the counter 5-2 starts to measure a width of a 1H period, and in accordance with the count value and register values X1, Y1, X2, Y2, X3, Y3, X4, and Y4 defining rising and falling of each of the timing signals Z1 to Z4, a plurality of timing signals are generated.

In the solid-state image pickup device, all of the P-phase readout PR, P-phase comparison PC, D-phase readout DR, D-phase comparison DC, and post D-phase process DAP are not fixed, but different period widths are set between moving image processing and still image processing, depending upon the operations.

With the above-described method, however, when a period width of 1H is changed, it would be necessary to perform setting change such as changing register values, which leads to a disadvantage that a complicated work may be required.

Accordingly, it would be desirable to provide a solid-state image pickup device, a driving method thereof, and a camera system in which it is not necessary to change register values or the like associated with the timing signals even if a period width is changed.

In accordance with one aspect of the present invention, there is provided a solid-state image pickup device which includes: a pixel array including pixels arranged in a matrix, wherein each pixel is configured to perform photoelectric conversion; a pixel signal readout unit for reading out a pixel signal from the pixel array in units of a plurality of pixels; and a timing control unit for controlling processing of the pixel signal readout unit by using a timing signal. The pixel signal readout unit includes a plurality of comparators disposed in correspondence with a column array of pixels, a plurality of counters whose operations are controlled by outputs of the comparators. Each comparator compares a readout signal potential with a reference voltage to generate a determination signal, and outputs the determination signal. Each counter counts a comparison time of each corresponding one of the comparators. The timing control unit divides a predetermined processing period into at least a first-time readout period, a first comparison period in which a comparison is performed by the comparator, a second-time readout period, and a second-time comparison period in which a comparison is performed by the comparator, classifies the periods into a period required as a fixed period and a period set with an arbitrary period width, and generates a timing signal of processing of each divided period by counting for each divided period in the counter.

The processing period may be one horizontal period.

The timing control unit may generate the timing signal by using, as a reference, a start or end of each period divided from the one horizontal period.

The timing control unit may include: a counter for performing a count operation from an initial value every time a state signal representative of a processing state of the divided period is switched; a sequencer circuit for generating the state signal of each divided period in accordance with information on each divided period and a count value of the counter and outputting the state signal to the counter; a register to which rising period designation information, falling period designation information on the timing signal, rising position designation information, and falling position designation information, on a timing signal generated for each processing state, are set, respectively; and a circuit configured to read out corresponding setting information of the resister every time the state signal is switched, and generate the timing signals for each state corresponding to the setting information and the count value.

In accordance with another aspect of the present invention, there is provided a driving method for a solid-state image pickup device, the solid-state image pickup device including: a pixel array including pixels for photoelectric conversion, arranged in a matrix; and a pixel signal readout unit for reading out a pixel signal from the pixel array in units of a plurality of pixels, wherein: the pixel signal readout unit includes a plurality of comparators disposed in correspondence with a column array of pixels for comparing a readout signal potential with a reference voltage to generate a determination signal, and outputting the determination signal, and a plurality of counters whose operations are controlled by outputs of the comparators, for counting a comparison time of each corresponding one of the comparators. The driving method includes: dividing a predetermined processing period into at least a first-time readout period, a first comparison period in which a comparison is performed by the comparator, a second-time readout period, and a second-time comparison period in which a comparison is performed by the comparator; classifying the periods into a period required as a fixed period and a period set with an arbitrary period width; generating the timing signal of processing of each divided period by counting with the counter for each divided period; and performing control and processing of the pixel signal readout unit by using the generated timing signal.

In accordance with a further aspect of the present invention, there is provided a camera system including a solid-state image pickup device and an optical system for focusing an object image on the solid-state image pickup device. The solid-state image pickup device includes a pixel array including pixels for photoelectric conversion disposed in a matrix, a pixel signal readout unit for reading out a pixel signal from the pixel array in units of a plurality of pixels, and a timing control unit for controlling processing of the pixel signal readout unit by using a timing signal. The pixel signal readout unit includes a plurality of comparators disposed in correspondence with a column array of pixels for comparing a readout signal potential with a reference voltage to generated a determination signal and outputting the determination signal, and a plurality of counters whose operations are controlled by outputs of the comparators, for counting a comparison time of each corresponding one of the comparators. The timing control unit divides a predetermined processing period at least into a first-time readout period, a first comparison period in which the comparison is performed by the comparator, a second-time readout period, and a second-time comparison period in which the comparison is performed by the comparator, classifies the periods into a period required as a fixed period and a period set with an arbitrary period width, and generates the timing signal of processing of each divided period by counting in the counter.

According to embodiments of the present invention, for example, one horizontal period is divided into at least a first readout period, a first comparison period in which the comparison is performed by the comparator, a second readout period, and a second comparison period in which the comparison is performed by the comparator, for a predetermined one process period. In the timing control unit, these divided periods are classified into a period required as a fixed period and a period set with an arbitrary period width, and a timing signal for processing each divided period is generated by counting each period with the counter.

Thus, the timing control unit controls the pixel signal readout process in accordance with the timing signal.

According to embodiments of the present invention, even if a period width is changed, register setting values for the timing signals are not required to be changed.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

FIG. 13 is a diagram showing an example of the structure of a camera system to which the solid-state image pickup device is applied according to an embodiment.

DETAILED DESCRIPTION OF EMBODIMENTS

Embodiments of the present invention will be described in connection with the accompanying drawings.

Figure 1:
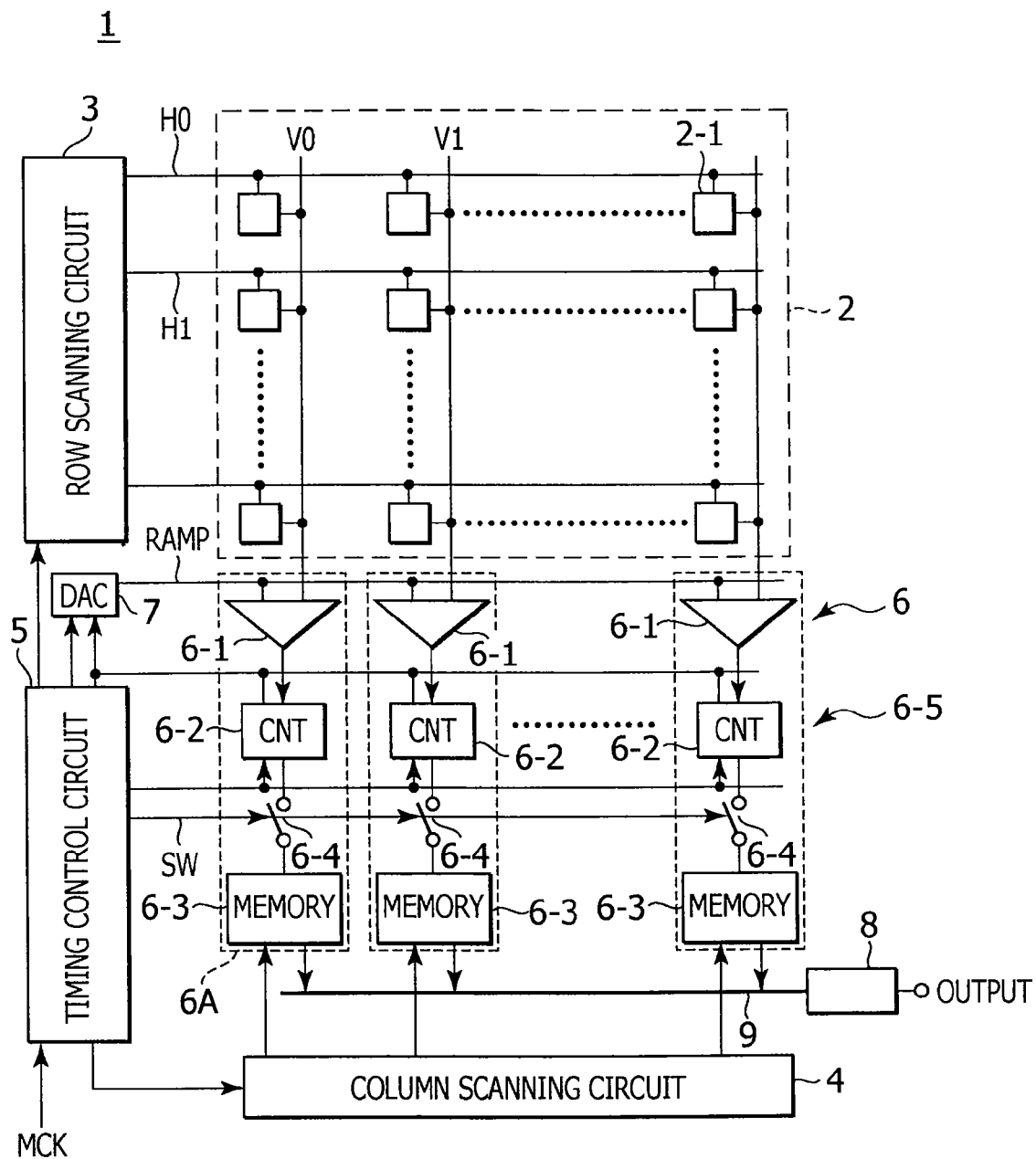
FIG. 1 is a block diagram showing a configuration example of solid-state image pickup device (CMOS image sensor) mounting a column-parallel ADC.
Figure 2:
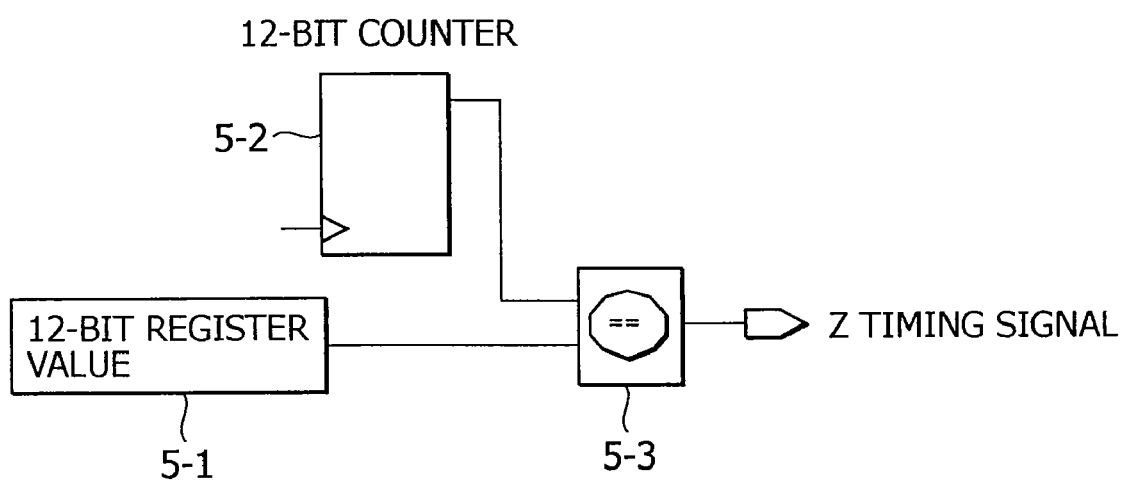
FIG. 2 is a diagram showing the fundamental structure of a timing signal generating system in a timing control circuit shown in FIG. 1.
Figure 3:
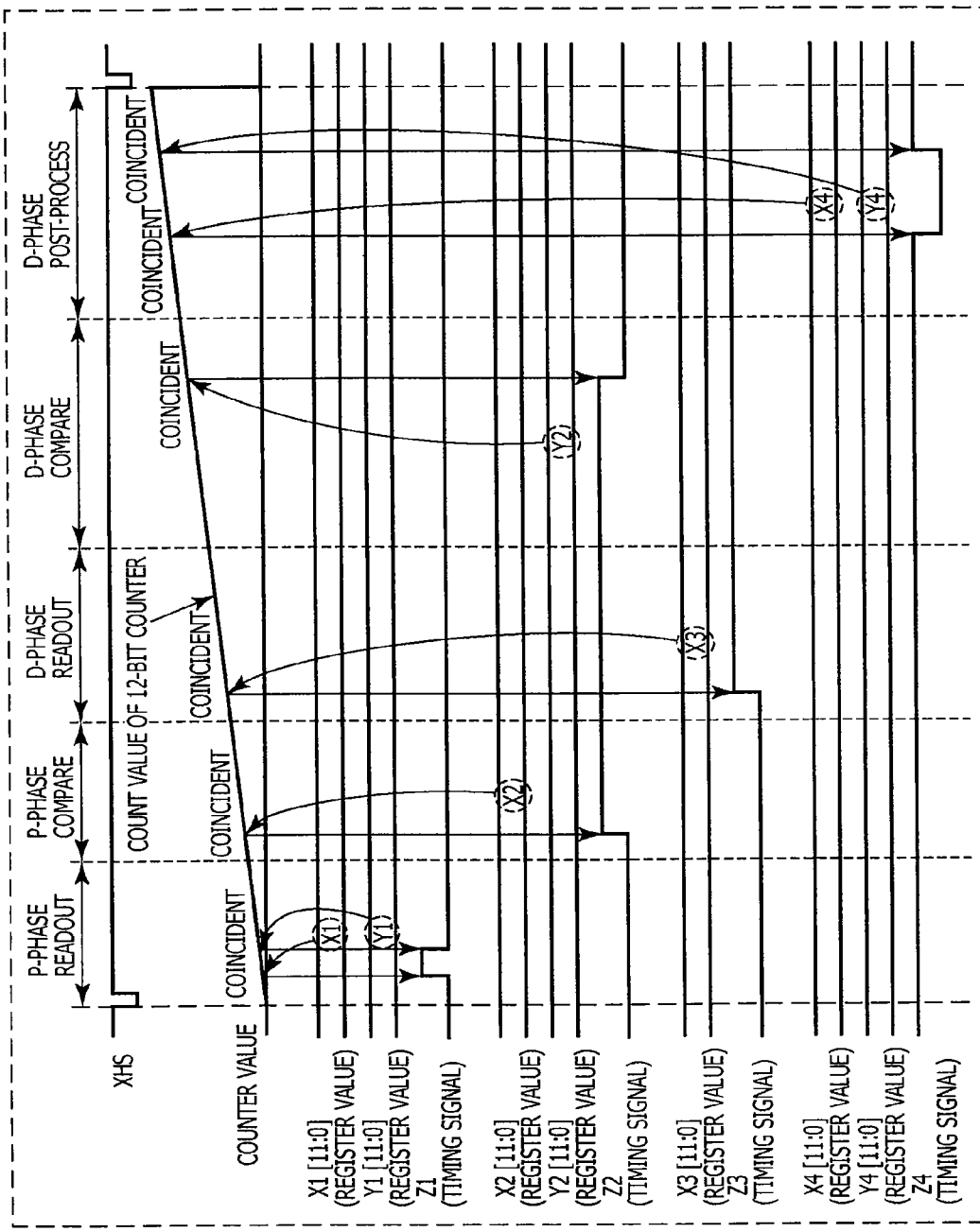
FIG. 3 is a timing chart illustrating an operation of generating a timing signal basing upon a circuit shown in FIG. 2.
Figure 4:
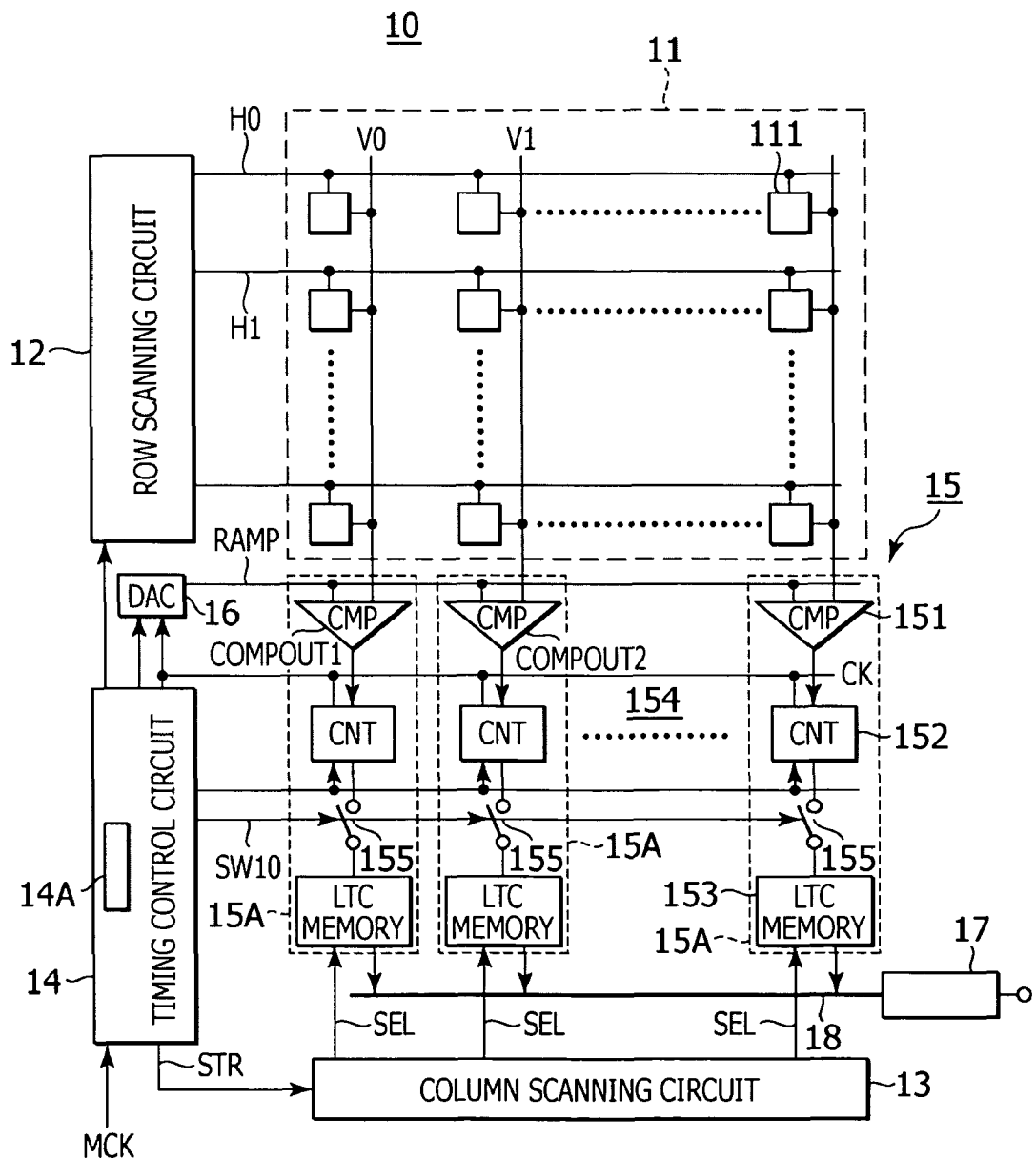
FIG. 4 is a block diagram showing an example of the structure of solid-state image pickup device (CMOS image sensor) mounting a column-parallel ADC according to an embodiment of the present invention.

FIG. 4 is a block diagram showing a configuration example of solid-state image pickup device (CMOS image sensor) mounting a column-parallel ADC including a data transfer circuit according to an embodiment of the present invention.

The solid-state image pickup device 10 includes a pixel array unit 11 as an imaging unit, a row scanning circuit 12, a column scanning circuit 13, a timing control circuit 14, an ADC group 15, a digital-to-analog converter unit (hereinafter abbreviated as "DAC") 16, and a data output circuit 17 including a sense amplifier circuit (S/A).

The pixel array unit 11 is composed of unit pixels 111, each including a photodiode and an intra-pixel amplifier, disposed in a matrix shape.

The solid-state image pickup device 10 includes, as a control circuit for sequentially reading out pixel signals of the pixel array unit 11: the timing control circuit 14 for generating internal clocks; the row scanning circuit 12 for controlling row addressing and row scanning; and the column scanning circuit 13 for controlling column addressing and column scanning.

The row scanning circuit 12, column scanning circuit 13, and ADC group 15 constitute a pixel signal readout unit.

In this embodiment, as will be later described in detail, the timing control circuit 14 divides 1H (one horizontal period) into periods required as a fixed period and a period set with an arbitrary period width, and each period is counted to generate a timing signal Z, and the pixel signal readout process is performed based on the timing signal.

The ADC group 15 includes column-parallel ADC blocks 154 each having an ADC 15A disposed for each of column lines V0, V1, ... of columns of the pixel array unit. The ADC blocks are composed of: (n+1) comparators (CMP) 151 disposed for the columns of the pixel array unit; asynchronous up/down counters (hereinafter called counters CNT) 152; memories (latches LTC) 153, and switched 155. The comparator (CMP) 151 compares a ramp waveform RAMP obtained by stepwise changing a reference voltage generated by DAC 16 with each of analog signals supplied from each of row lines H0, H1, ... via column lines V0, V1 .... The counter 152 counts up (or down) upon reception of an output of the comparator 151 and a clock CK. The memory 153 holds a count value of the counter 152. The switch 155 selectively connects either an output of the counter 152 or the memory 153 in accordance with a signal SW10.

An output of each memory 153 is connected to 2n data transfer lines 18 each having a 2-bit width. A data output circuit 17 including 2n sense circuits and 2n subtractor circuits are disposed for the 2n data transfer lines 18.

The counter 152 having a holding circuit function is in an up-count (or down-count) state at the initial stage to perform reset count. When the counter 152 performs a reset count to invert an output COMPOUTi of the corresponding comparator 151, the up-count operation is stopped to hold the count value in the memory 153.

In this case, the initial value of the counter 152 is assumed to have an arbitrary value of gradation of AD conversion, e.g., a value of "0". During this reset count period, reset components ΔV of the unit pixel 111 are read out.

Thereafter, the counter 152 enters a down-count state, performs data count corresponding to an incident light amount. When the output COMPOUTi of the corresponding comparator 151 is inverted, a count value corresponding to a comparison period is held in the memory 153.

The count values held in the memories 153 are scanned by the column scanning circuit 13, and inputted to the output circuit 17 via the data transfer lines 18.

In the solid-state image pickup device 10 having the structure described above, the following operation is performed in one horizontal unit period (1H).

Namely, during 1H, the first readout operation from the unit pixels 111 at an arbitrary row Hx to the column lines V0, V1, ... is represented by a P-phase readout PR, the first comparison at the comparator 151 is represented by a P-phase comparison PC, the second readout operation is represented by a D-phase readout DR, the second comparison at the comparator 151 is represented by a D-phase comparison DC, and a post process after D-phase processing is represented by a post D-phase process DAP, each operation being continuously performed.

The timing control circuit 14 performs timing control of the P-phase readout PR, P-phase comparison PC, D-phase readout DR, D-phase comparison DC, and post D-phase process DAP.

The timing signal generating circuit 14A of the timing control circuit 14 will be described.

The timing signal generating circuit 14A divides 1H (one horizontal period) into periods required as a fixed period and a period set with an arbitrary period width, and each period is counted to generate a timing signal Z.

More specifically, the timing signal generating circuit 14A counts each period.

The timing signal generating circuit 14A generates the timing signal on the basis of the start or end of each period divided from 1H. Thus, the timing generating circuit 14A is configured that even if a period width is changed, a change in settings such as changing register values for a timing signal setting change is not necessary when the period width of 1H is changed.

In an existing circuit, a period of 1H is measured with a counter having a 12-bit width. In this embodiment, however, the timing signal generating circuit 14A generates a timing signal for the 1H period by using a 10-bit width counter for counting five periods and a signal indicating each period outputted from a sequencer circuit.

Figure 5:
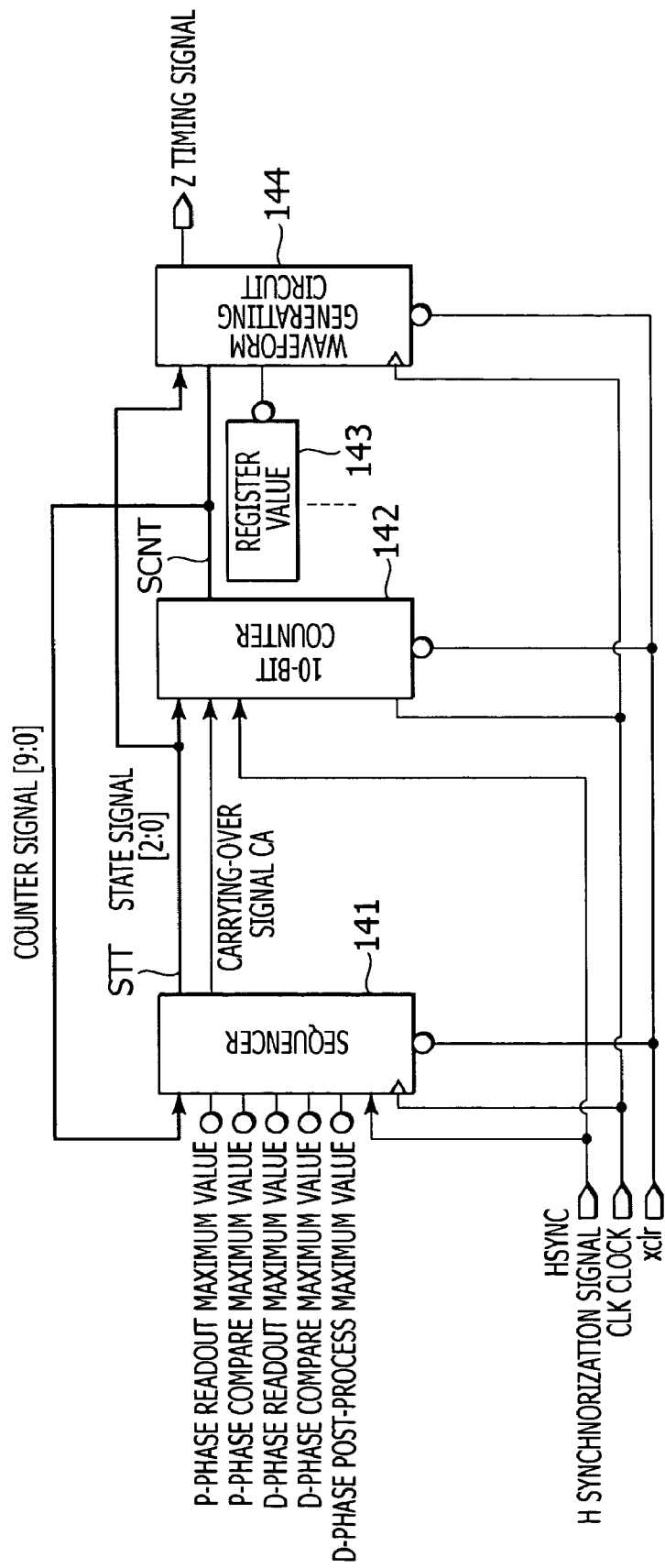
FIG. 5 is a diagram showing a configuration example of a timing signal generating circuit according to an embodiment.

FIG. 5 is a diagram showing a configuration example of the timing signal generating circuit according to an embodiment.

The timing signal generating circuit 14A shown in FIG. 5 includes a sequencer circuit 141, a 10-bit counter (hereinafter simply called a counter) 142, a register 143, and a waveform generating circuit 144.

The timing signal generating circuit 14A divides the period of 1H into five periods for P-phase readout PR, P-phase comparison PC, D-phase readout DR, D-phase comparison DC, and D-phase post process DAP for counting each period, and uses collectively one counter to reduce a circuit area. It is therefore possible to reduce the number of comparison bits for comparing between a count value and a register value for signal generation.

The sequencer circuit 141 receives a horizontal sync signal HSYNC, a P-phase readout PR, a P-phase comparison PC, D-phase readout DR, D-phase comparison, each maximum value of the D-phase post process DAP, and a counter signal SCNT of the counter 142, generates a state signal STT representative of each of five states of the P-phase readout PR, P-phase comparison PC, D-phase readout DR, D-phase comparison, and D-phase post process DAP, synchronously with the clock CLK, and outputs the state signal to the counter 142 and waveform generating circuit 144.

The sequencer circuit 141 outputs a carrying-over signal CA to the counter 142.

The sequencer circuit 141 enters an initial state in response to a clear signal XCLR.

Figure 6:
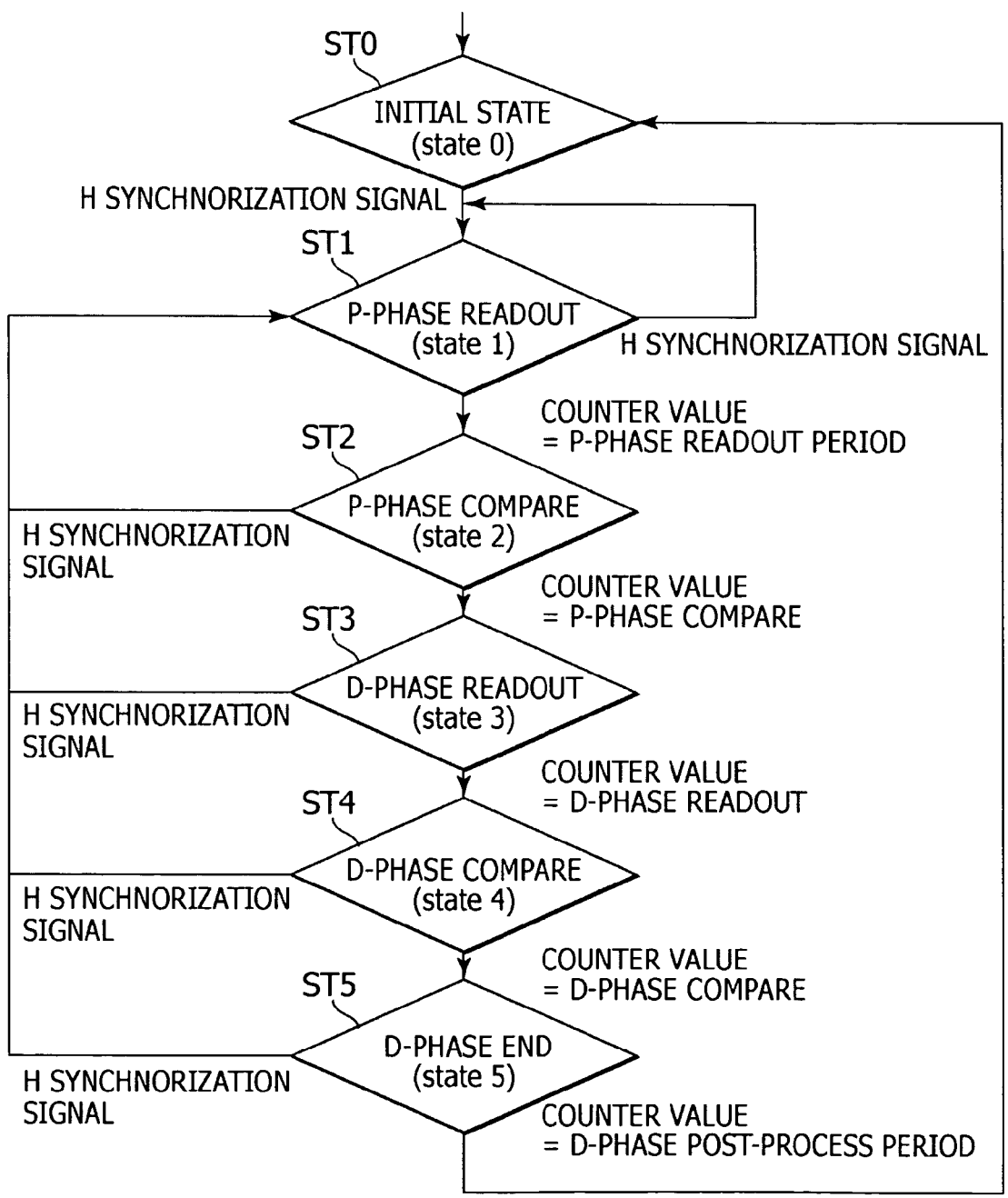
FIG. 6 is a flow chart illustrating an example of the operation of a sequencer circuit shown in FIG. 5.

FIG. 6 is a flow chart illustrating an example of the operation of the sequencer circuit 141.

<Step ST0>

In Step ST0, after a clear signal XCLR is inputted, the phase transits to an initial state ST0 to prepare an input of a horizontal sync signal HSYNC.

<Step ST1>

In Step ST1, when the horizontal sync signal HSYNC is inputted, the phase transits to a P-phase readout state ST (PR) to output a state signal STT1 to the counter 142.

<Step ST2>

In Step ST2, when it is determined by a count value of a received counter signal SCNT of the counter 142 that the P-phase readout period is terminated, the phase transits to the next P-phase comparison state ST (PC) to output a state signal STT2 to the counter 142.

<Step ST3>

In Step ST3, when it is determined by a count value of the received counter signal SCNT of the counter 142 that the P-phase comparison period is terminated, the phase transits to the next D-phase readout state ST (DR) to output a state signal STT3 to the counter 142.

<Step ST4>

In Step ST4, when it is determined by a count value of the received counter signal SCNT of the counter 142 that the D-phase readout period is terminated, the phase transits to the next D-phase comparison state ST (DC) to output a state signal STT4 to the counter 142.

<Step ST5>

In Step ST5, when it is determined by a count value of the received counter signal SCNT of the counter 142 that the D-phase comparison period is terminated, the phase transits to the next D-phase post process state ST (DAT) to output a state signal STT5 to the counter 142.

When it is determined by a count value of the received counter signal SCNT of the counter 142 that the D-phase post process period is terminated, the phase transits to the initial state ST0.

In Steps ST2 to St5, when the horizontal sync signal HSYNC is inputted, the phase transits to the P-phase readout state ST (PR).

The counter 142 receives the state signals STT1 to STT5, a carrying-over signal CA, and the horizontal sync signal HSYNC from the sequencer circuit 141, starts a count operation from an initial value synchronously with a clock CLK each time the state signal STT is switched, and outputs the count signal SCNT to the sequencer circuit 141 and waveform generating circuit 144.

The register 143 is set with information on the timing signal Z, generated for each of the P-phase readout state ST (PR), P-phase comparison state ST (PC), D-phase readout state ST (DR), D-phase comparison state ST (DC), and post D-phase process state ST (DAP), including rising period designation information (signal) FUS, falling period designation information (signal) FDS, rising position designation information (signal) FUP, and falling position designation information (signal) FDP.

The setting information (signals) of the register 143, FUS, FDS, FUP, and FDP, is read out (supplied) to the waveform generating circuit 144 each time the state signal STT is switched.

The waveform generating circuit 144 read outs the setting information (signals) FUS, FDS, FUP, and FDP each time the state signal STT is switched, and generates the timing signal Z corresponding to these information and count values, for the P-phase readout state ST (PR), P-phase comparison state ST (PC), D-phase readout state ST (DR), D-phase comparison state ST (DC), and D-phase post process state ST (DAP).

Figure 7:
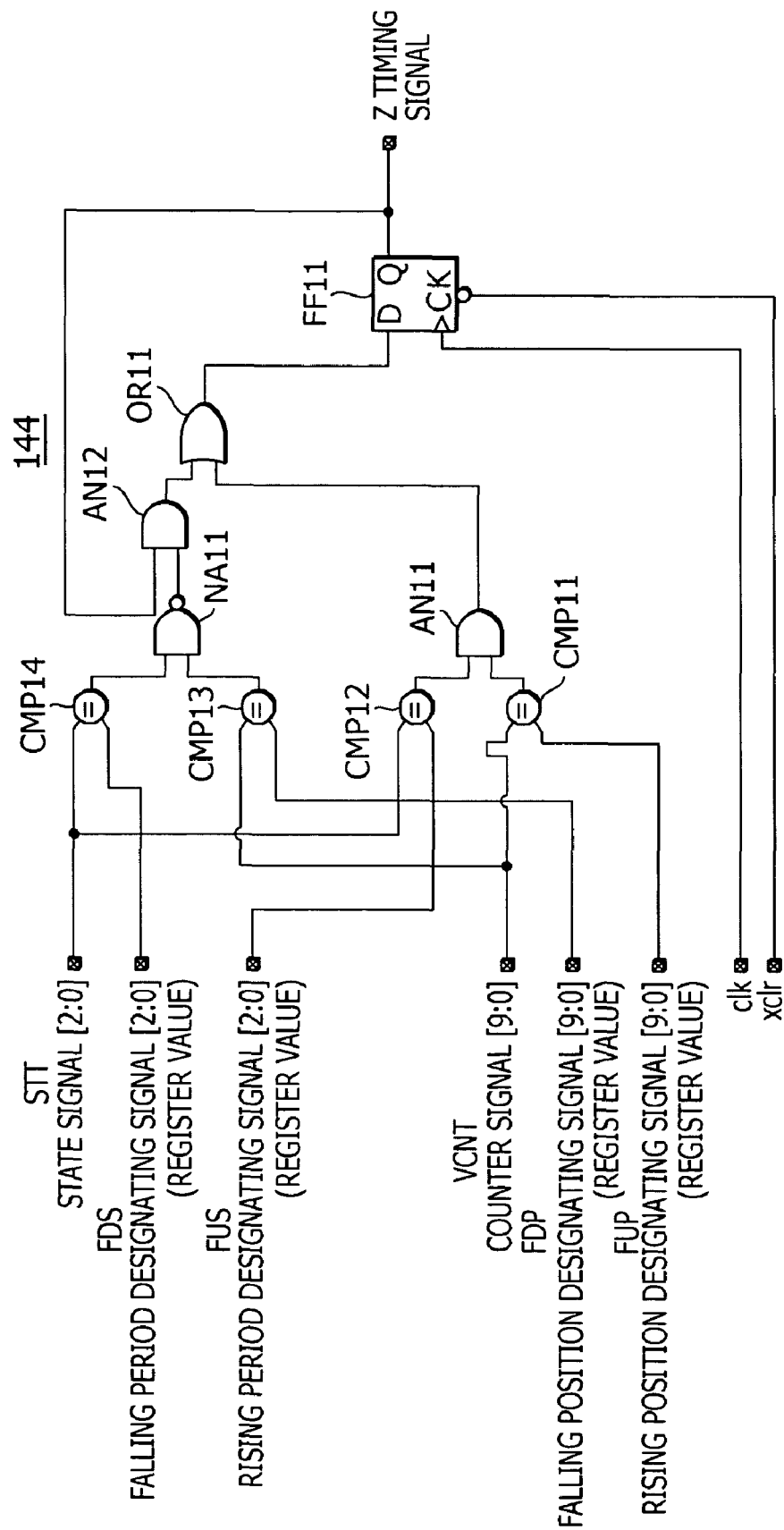
FIG. 7 is a circuit diagram showing an example of the structure of a waveform generating circuit shown in FIG. 5.

FIG. 7 is a circuit diagram showing an example of the structure of the waveform generating circuit shown in FIG. 5.

Figure 8:
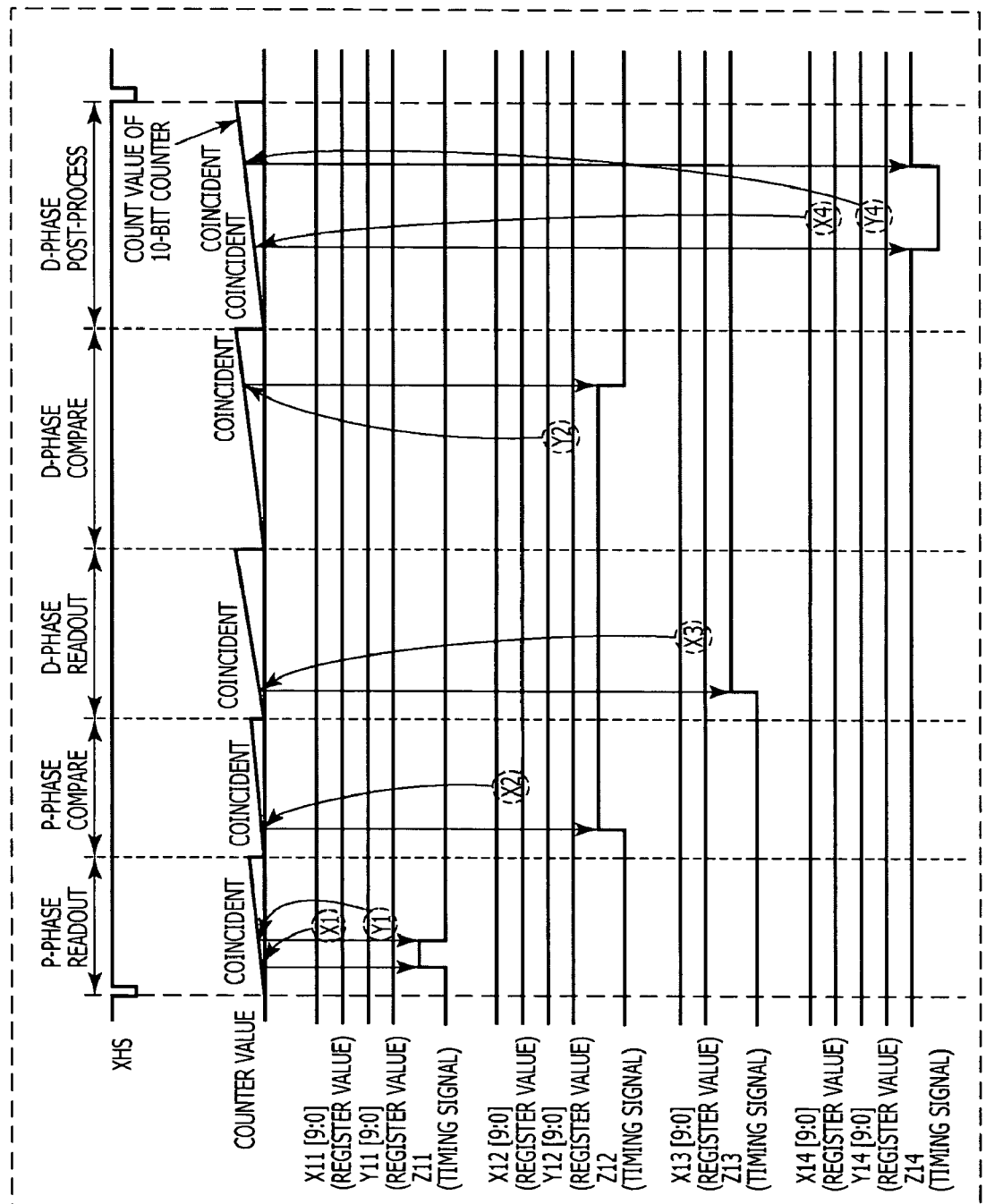
FIG. 8 is a timing chart illustrating the operation of the timing signal generating circuit according to an embodiment.

FIG. 8 is a timing chart illustrating the operation of the timing signal generating circuit according to an embodiment of the present invention.

The waveform generating circuit 144 shown in FIG. 7 includes comparators CMP11 to CMP14, two-input AND gates AN11 and AN12, a two-input NAND gate NA11, a two-input OR gate OR11, and a D-type flip-flop FF11.

The comparator CMP11 outputs a high level signal to one input terminal of the AND gate AN11 when a counter signal VCNT of the counter 142 becomes coincident with the rising position designation signal FUP which is the register value.

The comparator CMP12 outputs a high level signal to the other input terminal of the AND gate AN11, when the state signal STT of the sequencer circuit 141 becomes coincident with the rising period designation signal FUS which is the register value.

The comparator CMP13 outputs a high level signal to one input terminal of the NAND gate NA11, when the counter signal VCNT of the counter 142 becomes coincident with the falling position designation signal FDP which is the register value.

The comparator CMP14 outputs a high level signal to the other input terminal of the NAND gate NA11, when the state signal STT of the sequencer circuit 141 becomes coincident with the falling period designation signal FDS which is the register value.

An output of the AND gate AN11 is supplied to one input terminal of the OR gate OR11, and an output of the AND gate AN12 is supplied to the other input terminal. An output of the OR gate OR11 is supplied to a D input terminal of the flip-flow FF11.

An output of the NAND gate NA11 is supplied to one input terminal of the AND gate AN12, and a Q output of the flip-flop FF11 is supplied to the other input terminal.

With the structure described above, the comparator CMP11 outputs a high level signal to one input terminal of the AND gate AN11, when the counter signal VCNT of the counter 142 becomes coincident with the rising position designation signal FUP which is the register value.

The comparator CMP12 outputs a high level signal to the other input terminal of the AND gate AN11, when the state signal STT of the sequencer circuit 141 becomes coincident with the rising period designation signal FUS which is the register value.

Accordingly, an output of the AND gate AN11 becomes a high level so that the high level signal is supplied to the D input terminal of the flip-flop FF11.

As a result, a high level timing signal Z rising, synchronously with the clock CLK, at the period and position designated by the register values is outputted from the Q output terminal of the flip-flop FF11.

Description will be made in connection with FIG. 8. Regarding a timing signal Z11, the P-phase readout period PRS is designated by the rising period designation signal FUS, and a predetermined position of the P-phase readout period FRS is designated by the rising position designation signal FUP (a count value is designated). As a result, the timing signal Z11 rises at a predetermined position which is the P-phase readout period PRS.

Similarly, regarding a timing signal Z12, the P-phase comparison period PCS is designated by the rising period designation signal FUS, and a predetermined position of the P-phase comparison period PCS is designated by the rising position designation signal FUP (a count value is designated). As a result, the timing signal Z12 rises at a predetermined position which is the P-phase comparison period PRS.

Regarding a timing signal Z13, the D-phase readout period DRS is designated by the rising period designation signal FUS, and a predetermined position of the D-phase readout period DRS is designated by the rising position designation signal FUP (a count value is designated). As a result, the timing signal Z13 rises at a predetermined position which is the D-phase readout period DRS.

The comparator CMP13 outputs a high level signal to one input terminal of the NAND gate NA11 when the counter signal VCNT of the counter 142 becomes coincident with the falling position designation signal FDP which is the register value.

The comparator CMP14 outputs a high level signal to the other input terminal of the NAND gate NA11 when the state signal STT of the sequencer circuit 141 becomes coincident with the falling period designation signal FDS which is the register value.

The NAND gate NA11 receives two high level signals and outputs a low level signal, and the AND gate AN12 outputs a low level signal, whereby the signal is supplied to the D input terminal of the flip-flop FF11 via the OR gate OR11.

As a result, a timing signal Z is fallen synchronously with the clock CLK, from a high level to a low level at the period and position designated by the register values outputted from the Q output terminal of the flip-flop FF11.

Description will be made in connection with FIG. 8. For the timing signal Z11, the P-phase readout period PRS is designated by the falling period designation signal FDS, and a predetermined position of the P-phase readout period PRS is designated by the falling position designation signal FUP (a count value is designated). As a result, the timing signal Z11 falls at a predetermined position of the P-phase readout period PRS.

Regarding the timing signal Z12, the D-phase comparison period DCS is designated by the falling period designation signal FUS, and a predetermined position of the D-phase comparison period DCS is designated by the falling position designation signal FDP (a count value is designated). As a result, the timing signal Z12 falls at a predetermined position of the D-phase comparison period DCS.

In this embodiment, as shown in FIG. 8, on the basis of the timing signal XHS inputted from an external of the solid-state image pickup device 10, a count operation starts for the P-phase readout period PRS.

In the P-phase readout period PRS, the count operation is performed during a fixed period until a settlement time lapses for the reset level voltages outputted from the pixel array unit 11 via the column lines Vx.

A count operation for the P-phase comparison period PCS starts to compare the reset level voltages on the column lines Vx with the ramp waveform RAMP outputted from DAC 16.

The P-phase comparison period PCS is set to an arbitrary period depending upon settings of a resolution of DAC 16.

After the count operation for the P-phase comparison, a count operation starts for the D-phase readout period DRS. In the D-phase readout period DRS, the count operation is performed during a fixed period until a settlement time lapses for the reset level voltages output from the pixel array unit 11 via the column lines Vx.

A count operation for the D-phase comparison period DCS starts to compare the pixel data level voltages on the column lines Vx with the ramp waveform RAMP output from DAC 16. The D-phase comparison period DCS is set to an arbitrary period depending upon settings of a resolution of DAC 16.

After the count operation for the D-phase comparison, a count operation is performed during a fixed period in order to perform a process such as latching comparison result data.

Figure 9:
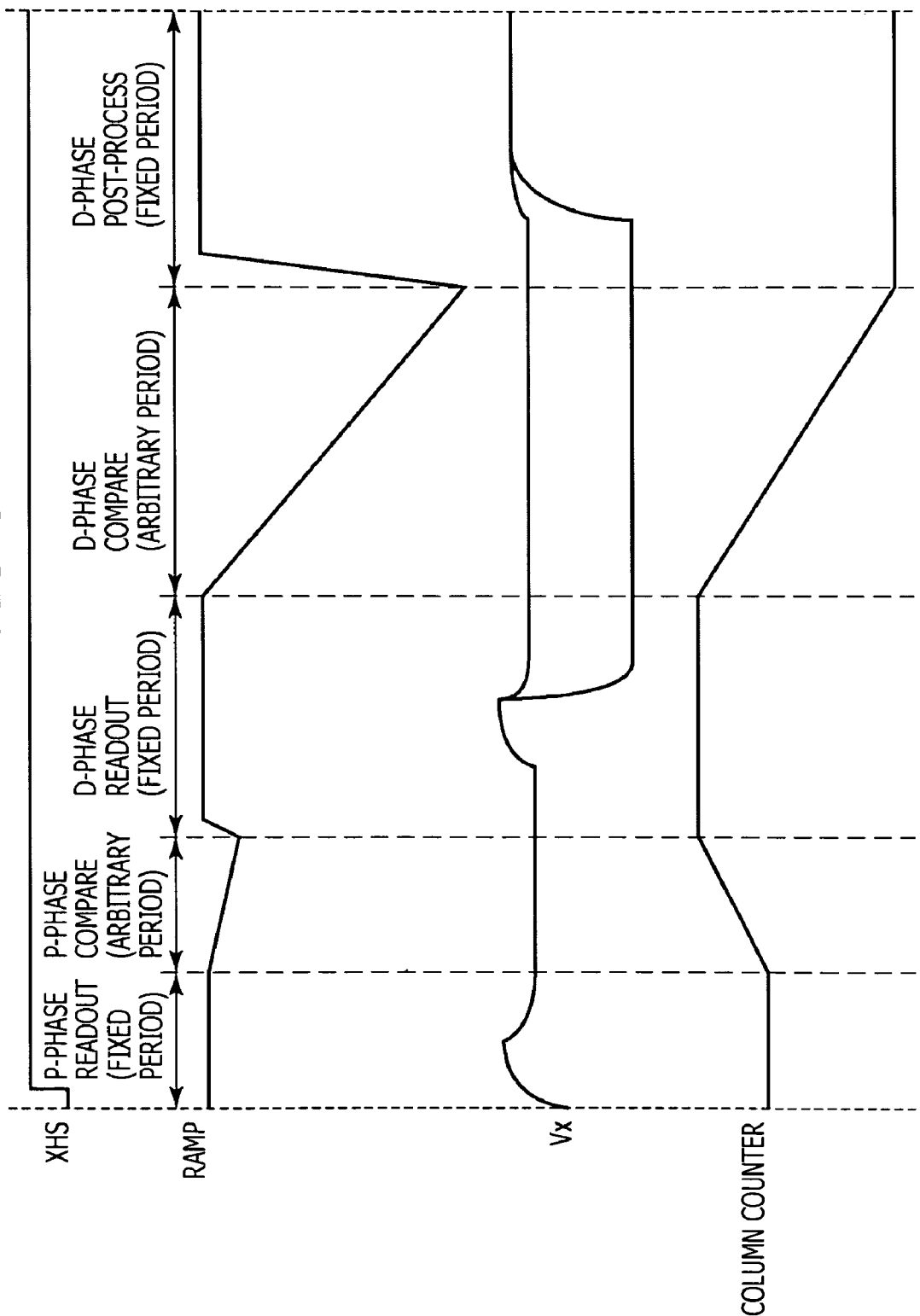
FIG. 9 is a diagram showing operation waveforms of ADC under normal settings.

FIG. 9 is a diagram showing the operation waveforms of ADC in normal settings.

Figure 10:
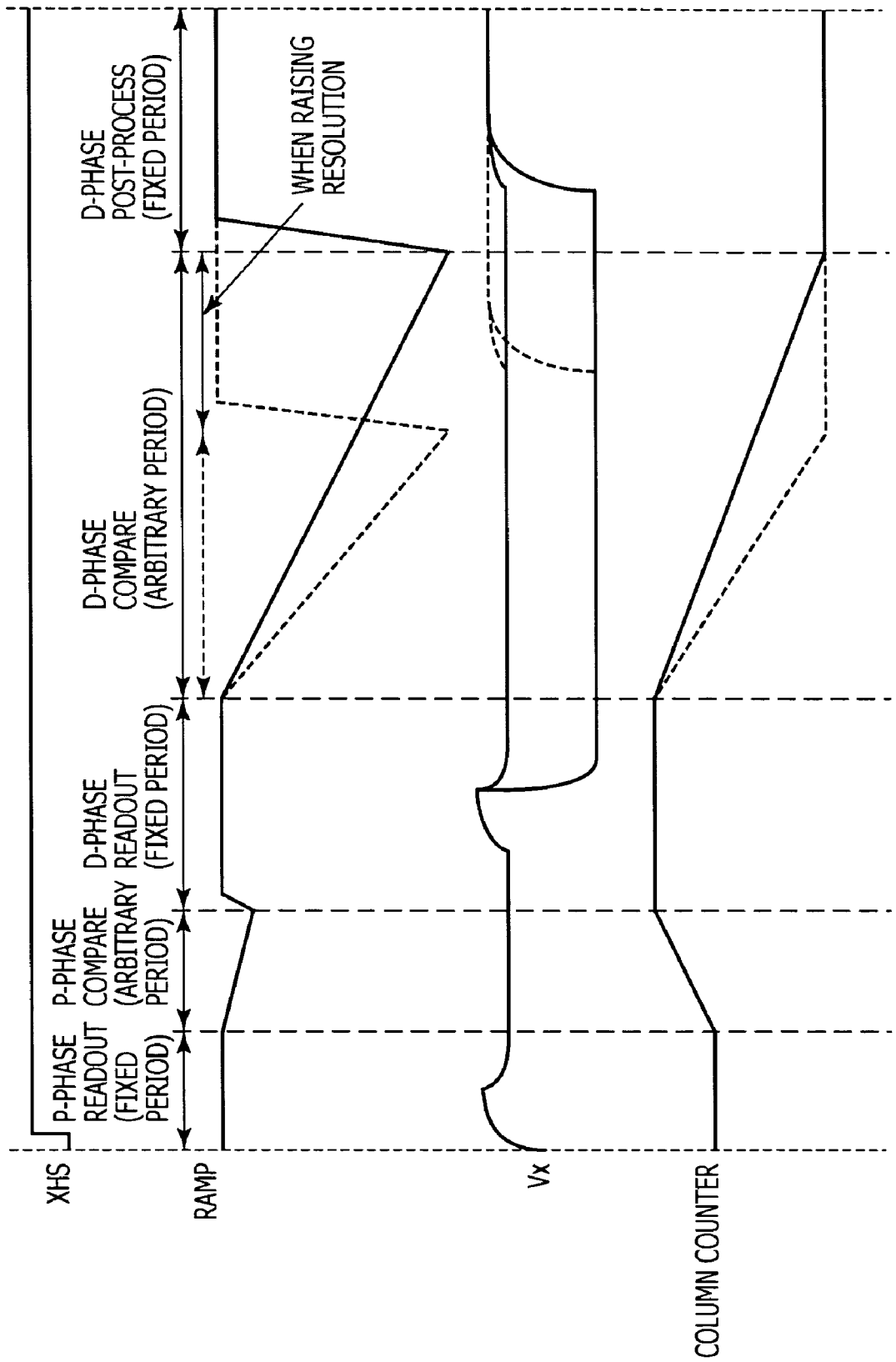
FIG. 10 is a diagram showing operation waveforms of ADC when a D-phase comparison period is elongated.

FIG. 10 is a diagram showing the operation waveforms of ADC when the D-phase comparison period is elongated.

As shown in FIGS. 9 and 10, to increase the measurement resolution for the pixel data level voltages outputted from the pixel array unit 11 during the D-phase comparison period DCS, it is necessary to elongate the D-phase comparison period, by an amount corresponding to an increase in the measurement resolution.

Description will be made on another specific example of elongating the P-phase readout period PRS.

Figure 11:
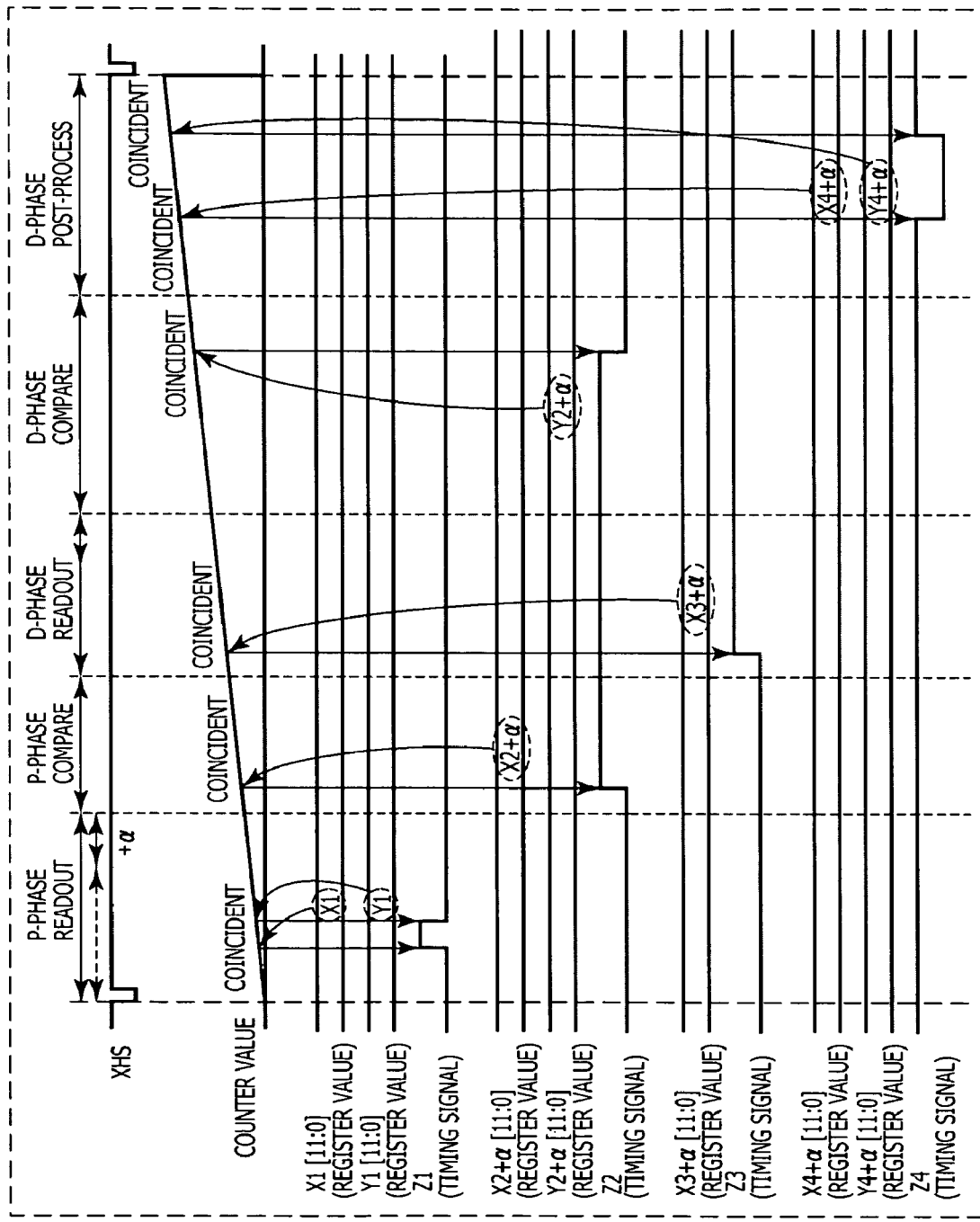
FIG. 11 is a diagram showing operation waveforms when a P-phase readout period PRS of an existing solid-state image pickup device is elongated.

FIG. 11 shows operation waveforms when the P-phase readout period PRS is elongated for an existing solid-state image pickup device.

Figure 12:
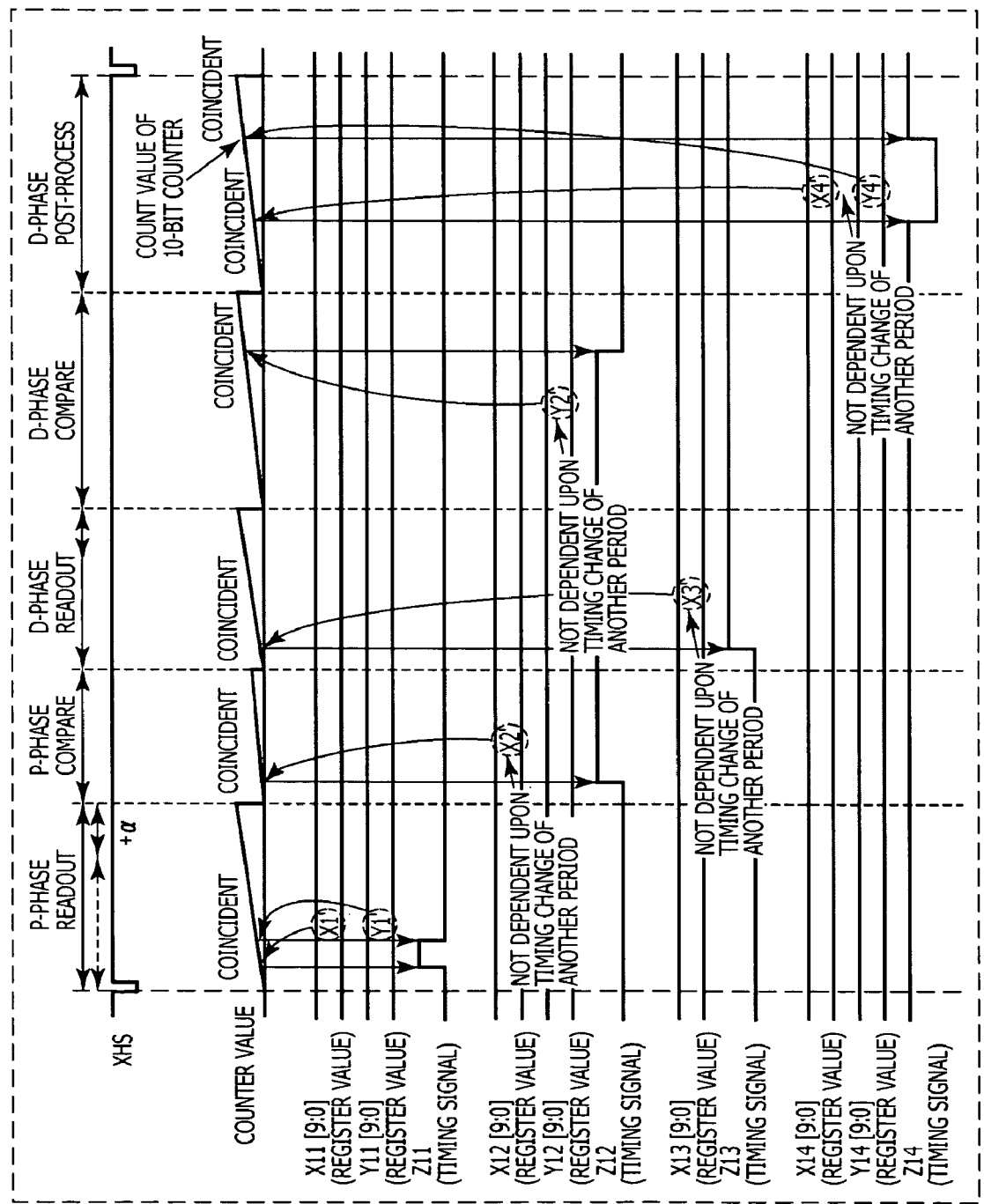
FIG. 12 is a diagram showing operation waveforms when a P-phase readout period PRS of a solid-state image pickup device of an embodiment is elongated.

FIG. 12 shows operation waveforms when the P-phase readout period PRS is elongated for the solid-state image pickup device of the embodiment.

In the existing solid-state image pickup device, if the P-phase readout period PRS is widened by +α as shown in FIG. 11, it is necessary to set again the value of +α to the register using signals generated in each period after the P-phase comparison period.

In contract, in the solid-state image pickup device of the embodiment, even if the P-phase readout period PRS is widened by +α as shown in FIG. 12, the count value of each period after the P-phase comparison period does not change, so that the timing signal can be generated without modifying the register values.

The operation of the solid-state image pickup device (CMOS image sensor) 10 will be described.

After a first readout operation from the unit pixels 111 at an arbitrary row Hx to the column lines V0, V1, . . . is stabilized, DAC 16 supplies the comparators 151 with the ramp waveform RAMP obtained by changing stepwise the reference voltage with time, and each comparator 151 compares RAMP with a voltage at the corresponding column line Vx.

In parallel with stepwise input of the ramp waveform RAMP, the counter 152 performs a first count operation.

In this case, when RAMP and a voltage at the column line Vx becomes equal, an output of the comparator 151 is inverted, so that the count operation of the counter 152 stops and a count value corresponding to the comparison period is held in the memory 153.

During the first readout operation, the reset components ΔV of the unit pixel 111 are read out. The reset components ΔV contain noises varying in each unit pixel 111 as an offset.

However, a variation in the reset components ΔV is generally small, and the reset level is common for all pixels. Therefore, an output at each column line Vx has generally a known value.

Therefore, during the first reset components ΔV readout operation, the comparison period can be shortened by adjusting a ramp waveform (RAMP) voltage. In this case, for example, comparing ΔV is performed during a count period of 7 bits (128 clocks).

The second readout operation performs an operation similar to the first readout operation, by reading out signal components corresponding to an incident light amount of each unit pixel 111 in addition to the reset components ΔV.

Namely, after the second operation of reading out from the unit pixels 111 at the arbitrary row Hx to the column lines V0, V1, . . . is stabilized, DAC 16 supplies the comparators 151 with the ramp waveform RAMP obtained by changing stepwise the reference voltage with time, and each comparator 151 compares RAMP with a voltage at the corresponding column line Vx.

In parallel with stepwise input of the ramp waveform RAMP, the counter 152 performs a second count operation.

In this case, when RAMP and a voltage at the column line Vx becomes equal, an output of the comparator 151 is inverted and at the same time the count value corresponding to the comparison period is held in the memory 153.

In this case, the first count value and second count value are held in the memory 153 at different positions.

After the completion of the above-described AD conversion, the column scanning circuit 4 transfers the first and second digital signals of n-bit held in the memories 153 via the 2n data transfer lines, the data output circuit 17 detects the digital signals, and the subtractor circuits sequentially perform (second signals)-(first signals) and the results are outputted to the external. Thereafter, a similar operation is repeated for each row to generate a two-dimensional image.

The above operation is performed in one horizontal unit period (1H).

During 1H, the first readout operation from the unit pixels 111 at an arbitrary row Hx to the column lines V0, V1, ... is represented by a P-phase readout PR, a first comparison at the comparator 151 is represented by a P-phase comparison PC, the second readout operation is represented by a D-phase readout DR, the second comparison at the comparator 151 represented by a D-phase comparison DC, and a post process after D-phase processing is represented by a post D-phase process DAP, to continuously perform each operation.

The timing control circuit 14 performs timing control of the P-phase readout PR, P-phase comparison PC, D-phase readout DR, D-phase comparison DC, and post D-phase process DAP.

As described above, according to the embodiment, 1H (one horizontal period) is divided into five periods: the P-phase readout PR, the P-phase comparison PC, the D-phase readout DR, the D-phase comparison DC, and the D-phase post process DAP, and these periods are classified into a period required as a fixed period and a period set with an arbitrary period width. Each period is counted. If a width of any period in 1H is changed, it is necessary to change the register setting values for generating the timing signal by using the periods after the changed period. However, in this embodiment, the register setting values for the timing signal are not required to be changed since the timing signal generating circuit 14A for generating the timing signal Z is used.

In addition, since the 1H period is divided and counted, register setting bits can be reduced for a timing signal whose rising or falling edge is confined to some periods.

The solid-state image pickup device having these advantages is applicable to an image pickup device of a digital camera or a video camera.

FIG. 13 is a diagram showing an example of the structure of a camera system to which the solid-state image pickup device is applied according to an embodiment of the present invention.

As shown in FIG. 13, the camera system 20 includes an imaging device (image pickup device) to which the solid-state image pickup device 10 of the embodiment is applicable, and an optical system for guiding incident light to the pixel area of the imaging device 21 (for forming an object image), for example, a driver circuit (DRV) for driving a lens 22 and the imaging device 21, wherein the driving lens 22 allows the incident light (image light) to form an image on a imaging surface, and a signal processing circuit (PRC) 24 for processing an output signal of the imaging device 21.

The driver circuit 23 includes a timing generator (not shown) for generating various timing signals including a start pulse and a clock pulse for driving circuits in the imaging device 21, and drives the imaging device 21 by predetermined timing signals.

The signal processing circuit 24 performs signal processing such as correlated double sampling (CDS) for an output signal of the imaging device 21.

An image signal processed by the signal processing circuit 24 is recorded in a recording medium such as a memory. Image information recorded in the recording medium is hard-copied with a printer or the like. Image signals processed by the signal processing circuit 24 are displayed as moving images on a monitor such as a liquid crystal display.

As described above, by mounting the above-described image pickup device 10 on the imaging apparatus such as a digital still camera as the imaging device 21, a high precision camera can be provided.

It is noted that the specific forms and structures of the various parts and the numeric values indicated in each of the embodiments and the above numeral examples are merely given as examples for implementation of embodiments of the present invention. It is therefore to be understood that the technical scope of the present invention should in no way be limited by the above.

What is claimed is:

1. A solid-state image pickup device comprising:
   a pixel array including pixels arranged in a matrix, wherein each pixel is configured to perform photoelectric conversion;
   a pixel signal readout unit for reading out a pixel signal from the pixel array in units of a plurality of pixels; and
   a timing control unit for controlling processing of the pixel signal readout unit by using a timing signal,
   wherein the pixel signal readout unit includes:
      a plurality of comparators, disposed in correspondence with a column array of pixels, for comparing a readout signal potential with a reference voltage to generate a determination signal and outputting the determination signal, and
      a plurality of counters whose operations are controlled by outputs of the comparators, wherein each of the counters counts a comparison time of each corresponding one of the comparators; and
   wherein the timing control unit (a) divides a predetermined processing period into at least a first-time readout period, a first comparison period in which a comparison is performed by the comparator, a second-time readout period, and a second-time comparison period in which a comparison is performed by the comparator, (b) classifies the periods into a period required as a fixed period and a period set with an arbitrary period width, and (c) generates a timing signal of processing of each divided period by counting for each divided period in the counter.

2. The solid-state image pickup device according to claim 1, wherein the processing period is one horizontal period.

3. The solid-state image pickup device according to claim 2, wherein the timing control unit generates the timing signal by using a start or end of each period divided from the one horizontal period as a reference.

4. The solid-state image pickup device according to claim 1, wherein the timing control unit comprises:
   a counter for performing a count operation from an initial value every time a state signal representative of a processing state of the divided period is switched;
   a sequencer circuit for generating the state signal of each divided period in accordance with information on each divided period and a count value of the counter and outputting the state signal to the counter;
   a register to which rising period designation information, falling period designation information, rising position designation information, and falling position designation information, on a timing signal generated for each processing state, are set, respectively; and
   a circuit configured to read out corresponding setting information of the resister every time the state signal is switched, and generate the timing signals for the respective states corresponding to the setting information and the count value.

5. The solid-state image pickup device according to claim 3, wherein the timing control unit comprises:
   a counter for performing a count operation from an initial value each time a state signal representative of a processing state of the divided period is switched;
   a sequencer circuit for generating the state signal of each divided period in accordance with information on each divided period and a count value of the counter and outputting the state signal to the counter;

a register to which rising period designation information, falling period designation information, rising position designation information, and falling position designation information, on a timing signal generated for each state, are set, respectively; and a circuit configured to readout corresponding setting information of the resister every time the state signal is switched, and generate the timing signal for each state corresponding to the setting information and the count value.

6. A driving method for a solid-state image pickup device, the solid-state image pickup device which includes a pixel array including pixels, arranged in a matrix, for performing photoelectric conversion; and a pixel signal readout unit for reading out a pixel signal from the pixel array in units of a plurality of pixels, wherein the pixel signal readout unit includes a plurality of comparators disposed in correspondence with a column array of pixels for comparing a readout signal potential with a reference voltage to generate a determination signal, and outputting the determination signal, and a plurality of counters whose operation are controlled by outputs of the comparators, for counting a comparison time of each corresponding one of the comparators, the method comprising the steps of:

dividing a predetermined processing period into at least a first-time readout period, a first comparison period in which a comparison is conducted by the comparator, a second-time readout period, and a second-time comparison period in which a comparison is performed by the comparator;

classifying the periods into a period required as a fixed period and a period set with an arbitrary period width;

generating the timing signal of processing of each divided period by counting in the counter; and performing control and processing of the pixel signal readout unit by using the generated timing signal.

7. The driving method for a solid-state image pickup device according to claim 6, wherein the processing period is one horizontal period.

8. The driving method for a solid-state image pickup device according to claim 7, wherein the timing signal is generated by using a start or end of each period divided from the one horizontal period as a reference.

9. A camera system comprising:

a solid-state image pickup device; and an optical system for focusing an object image on the solid-state image pickup device, wherein:

the solid-state image pickup device includes:

a pixel array including pixels for photoelectric conversion disposed in a matrix, a pixel signal readout unit for reading out a pixel signal from the pixel array in units of a plurality of pixels, and a timing control unit for controlling processing of the pixel signal readout unit by using a timing signal;

the pixel signal readout unit includes:

a plurality of comparators disposed in correspondence with a column array of pixels for comparing a readout signal potential with a reference voltage to judge the comparison and outputting a judgment signal, and a plurality of counters whose operation is controlled by outputs of the comparators, for counting a comparison time of each corresponding one of the comparators; and the timing control unit (a) divides a predetermined processing period at least into a first-time readout period, a first comparison period in which a comparison is performed by the comparator, a second-time readout period and a second-time comparison period in which a comparison is performed by the comparator, (b) classifies the periods into a period required as a fixed period and a period set with an arbitrary period width, and (c) generates the timing signal of processing of each divided period by counting with the counter.

* * * * *